Feb. 11, 1964  R. M. BUCHWALD  3,120,673
CONCEALED WINDSHIELD WIPER MECHANISM
Filed May 14, 1962  3 Sheets-Sheet 1

INVENTOR.
ROBERT M. BUCHWALD
BY
HIS ATTORNEY

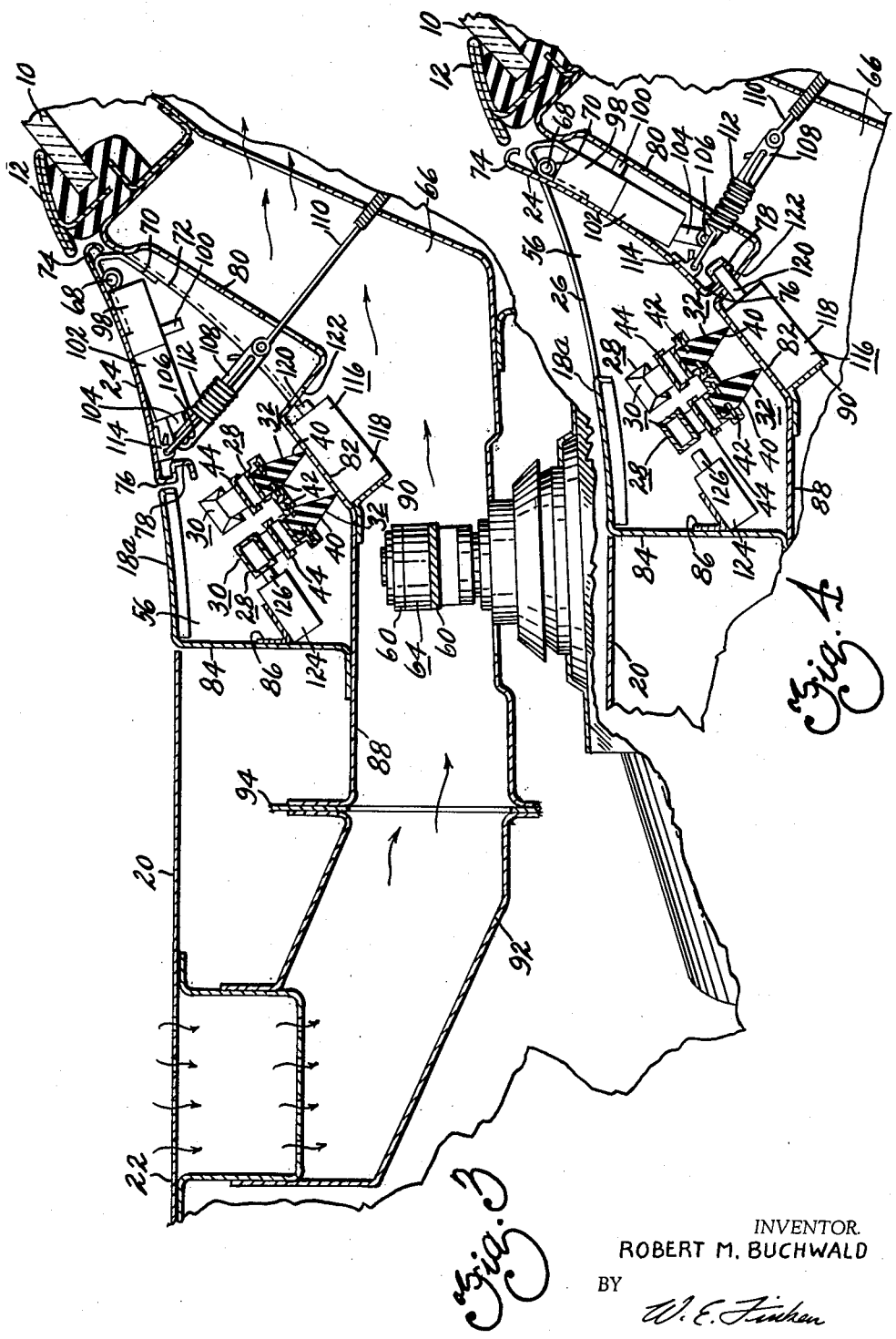

Feb. 11, 1964 R. M. BUCHWALD 3,120,673
CONCEALED WINDSHIELD WIPER MECHANISM
Filed May 14, 1962 3 Sheets-Sheet 3

INVENTOR.
ROBERT M. BUCHWALD
BY
W. E. Finkca
HIS ATTORNEY

United States Patent Office 3,120,673
Patented Feb. 11, 1964

3,120,673
CONCEALED WINDSHIELD WIPER MECHANISM
Robert M. Buchwald, Berkley, Mich., assignor to General Motors Corporation, Detroit, Mich., a corporation of Delaware
Filed May 14, 1962, Ser. No. 194,406
11 Claims. (Cl. 15—250.17)

This invention pertains to windshield cleaning mechanism, and particularly to an improved wiper mechanism for vehicular windshields which is concealed when not in use.

Heretofore, various proposals have been made for concealing wiper arm and blade assemblies when not in use. In general, the prior art arrangements enable the wiper blades and arms together with their pivot shafts to be stowed in a well beneath the cowl of the vehicle, the well being closed by a cover which either is slidably supported for retracting movement, or hinged at its forward edge for opening movement. The present invention relates to a simplified concealed wiper mechanism wherein the cover is hinged at its rearward edge so as to be rotatable inwardly into the well, in combination with an improved interlocked control system for the wiper mechanism and a cover latch.

Accordingly, among my objects are the provision of improved concealed windshield wiper mechanism for a vehicle; the further provision of a vehicle having concealed wiper mechanism including a pivotally mounted cover which, when opened, does not obstruct vision or interfere with the normal air flow across the windshield; the further provision of concealed windshield wiper mechanism wherein the cover, when opened, forms a ramp over which the wiper blades move from a stowed position to an operating position whereat the wiper blades engage the windshield; and the still further provision of an interlocked control system for the wiper mechanism and the cover operating mechanism to preclude operation of the wiper mechanism when the cover is closed, or closure of the cover when the wiper mechanism is operating.

The aforementioned and other objects are accomplished in the present invention by stowing the wiper mechanism in a well beneath the cowl of the vehicle when it is not in use, and embodying cover operated switch means and wiper mechanism operated switch means in the interlocked control system. Specifically, the wiper mechanism, per se, may be of the electric motor operated type such as shown in Patent No. 3,025,553 comprising a pair of wiper blade and arm assemblies which are oscillated conjointly in phase opposition by an electric motor operated linkage drive, and wherein the paths of the wiper blades overlap over the central portion of the windshield without interference. During their wiping strokes, the wiper blades remain in contact with the windshield surface, the wiper blades and arms being movable to depressed park positions within the cowl well whereat the blades are maintained in firm engagement with each other.

The cover is hinged at its rearward edge so as to pivot downwardly into the well, thus forming a ramp over which the wiper blades move from their stowed position to their operating position, and vice versa. The interlocked control system comprises a pair of cover carried switches, one of which is automatically closed when the cover is fully open and the other of which can be manually closed and opened by the cover operating means. A third switch controls a solenoid latch for retaining the cover in its fully open position, the third switch being opened by the wiper blades and arms in their parked positions, and automatically closed when the wiper blades and arms are moved out of their parked positions. The wiper mechanism can only be operated when both door carried switches are closed, and the cover can only be closed after the solenoid latch is released, at which time the wiper blades and arms must be in their depressed parked positions within the well.

Further objects and advantages of the present invention will be apparent from the following description, reference being had to the accompanying drawings, wherein a preferred embodiment is clearly shown, and wherein similar numerals depict similar parts throughout the several views.

In the drawings:

FIGURE 3 is an enlarged fragmentary view, partly in section and partly in elevation, taken along line 3—3 of FIGURE 1.

FIGURE 4 is a fragmentary view similar to FIGURE 3 showing the cover in its fully open position.

Figure 1:
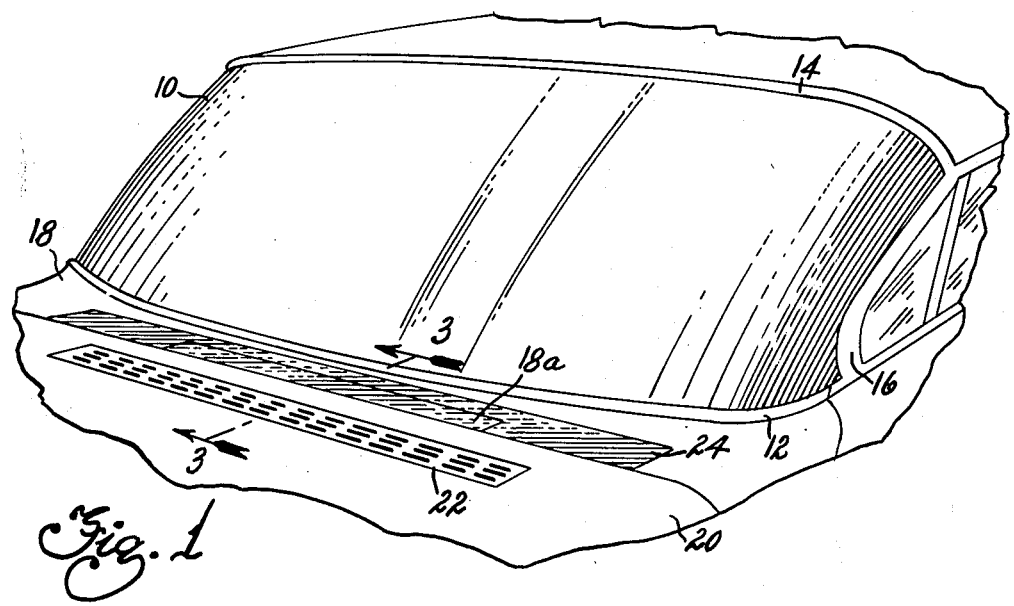
FIGURE 1 is a fragmentary perspective view, in elevation, of a vehicle equipped with the improved concealed wiper mechanism of this invention.
Figure 2:
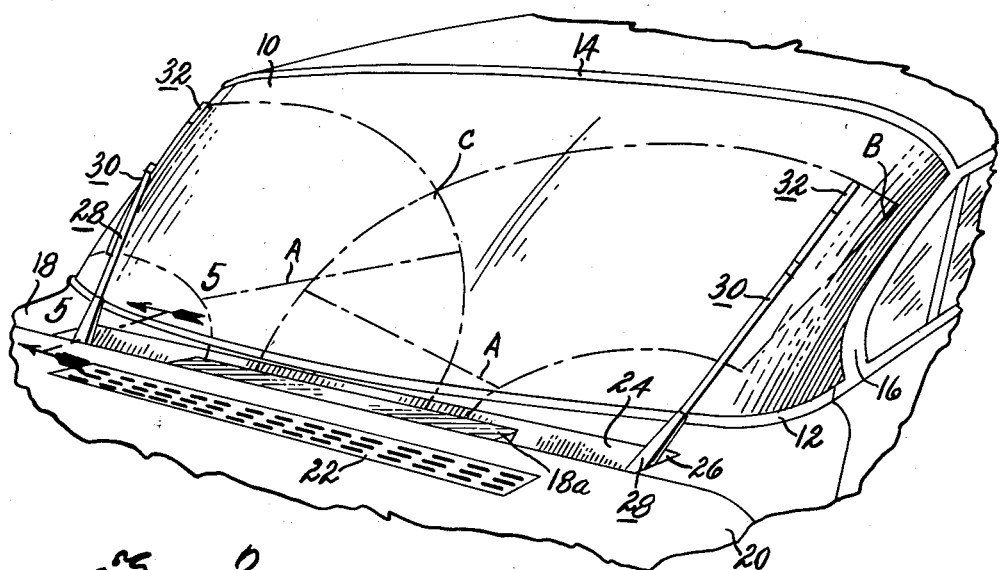
FIGURE 2 is a view similar to FIGURE 1 with the wiper mechanism in its operating position.

With particular reference to FIGURES 1 and 2, a portion of a vehicle is shown including a curved windshield 10 having a lower reveal molding 12, an upper, or header, reveal molding 14 and side pillars 16. The vehicle has a forwardly extending cowl 18, and an engine hood 20 having a louvered air intake grille 22. A substantially C-shaped cover 24 is hinged along its rearward edge to the cowl for closing a complementary opening therein as seen in FIGURE 1. When the cover 24 is pivoted downwardly, as seen in FIGURE 2, the cowl opening 26 is exposed thus permitting a pair of wiper assemblies 28 to be oscillated across the outer surface of the windshield 10.

The wiper assemblies 28 comprise wiper arms 30 which are spring biased towards the windshield and carry flexible wiper blades 32, the wiper blades 32 being movable throughout wiping strokes having inboard stroke end limits A and outboard stroke end limits B, the paths of the wiper blades 32 overlapping in the area C at the central portion of the windshield 10 in a manner similar to that shown in the aforementioned Patent 3,025,553. The wiper blade and arm assemblies 28 are movable in depressed parked positions beneath the cowl 18 when not in use so that when the cover 24 is closed, as seen in FIGURE 1, the wiper arm and blade assemblies are concealed from view.

Figure 5:
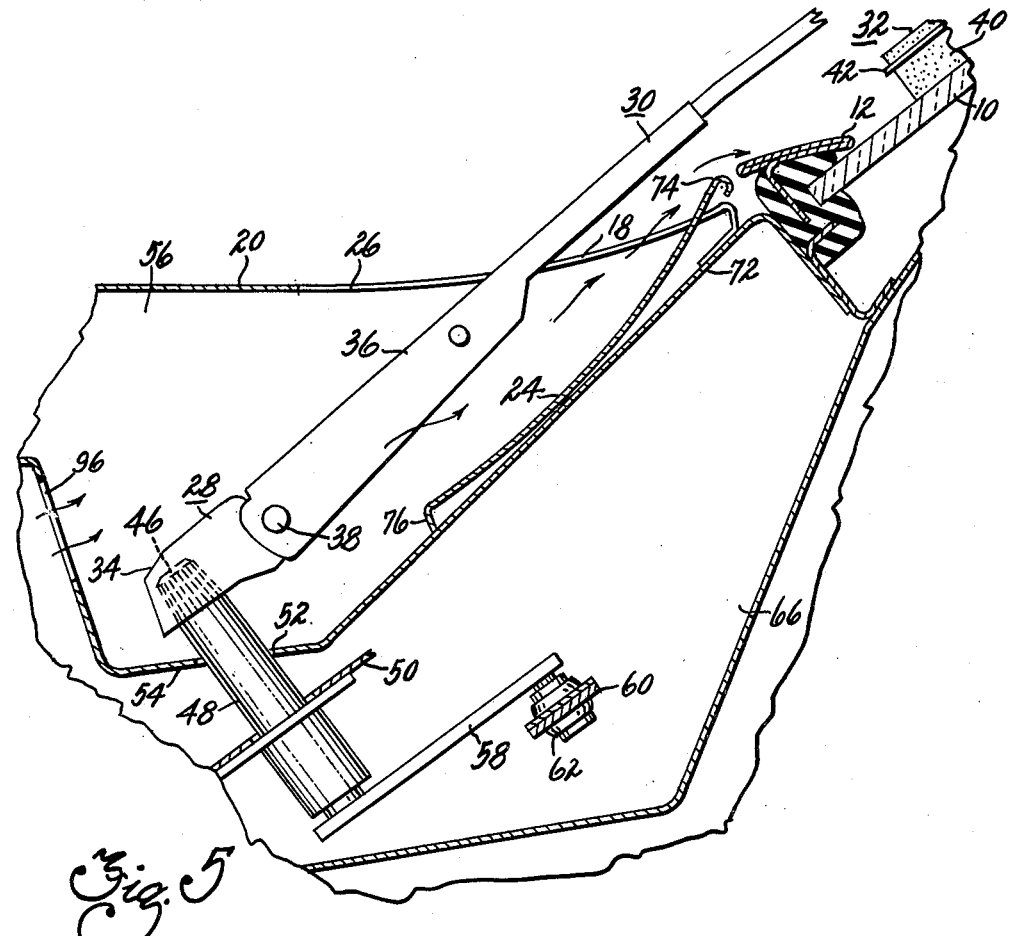
FIGURE 5 is an enlarged fragmentary view, partly in section and partly in elevation, taken along line 5—5 of FIGURE 2.

With reference to FIGURES 3 through 5, the wiper arms 30 comprise socket sections 34 and blade carrying sections 36 which are spring hinged to the socket sections 34 for movement towards and away from the windshield 10 about the axes of transverse pivot pins 38. The wiper blades 32 may be of conventional construction and thus comprise elastomeric squeegees 40 which are constrained to flex in only a single plane normal to the windshield 10 by backing strips 42 to which pressure is applied at a plurality of longitudinally spaced apart points by a superstructure 44 comprising a plurality of relatively movable members. The socket sections 34 of the wiper arms 30 are drivingly connected to spaced pivot shafts 46 journalled in housings 48 secured to a shroud panel 50 and extending through apertures 52 in the bottom wall 54 of a well 56 within which the wiper blade and arm assemblies are stowed when not in use. The pivot shafts 46 are attached to crank arms 58 having their outer ends connected to drive links 60 through ball and socket connections 62. The drive links 60 have their inner ends pivotally connected to a variable throw crank assembly 64 mounted centrally of the vehicle and extending into a plenum chamber 66. The variable throw crank assembly 64 is preferably of the type disclosed in Patent 2,985,024 which is driven by an electric motor, not shown.

The cover 24 is hinged at 68 to the cowl 18 along a substantially horizontal axis, and normally biased to the closed position by one or more torsion springs 70 which have intermediate portions encircling the hinge pin and leg portions engaging the inner surface of the cover 24 and the rear wall 72 of the well 56. The exterior surface of the cover 24 is slightly concave in cross-section as shown clearly in FIGURES 3 through 5. The rearward edge of the cover is flanged inwardly along a radius at 74, and the forward edge of the cover is flanged inwardly at 76 with a forwardly facing slot 78, or channel, at its central portion.

The rear wall 72 of the well 56 is upwardly inclined as seen in FIGURE 5 and includes an inwardly depressed upper wall portion 80 in the area of the medial cowl portion 18a and a laterally elongate, forwardly projecting wall portion 82 which forms a continuation of the concave exterior surface of the cover 24 in its open position as seen in FIGURE 4. The wall portion 82 is of sufficient width to fully support both wiper blades 32 throughout their full lengths in their parked positions as seen in FIGURE 3. A vertical flange 84 of the medial cowl portion 18a forms the central part of the front wall of the well 56 to which a switch bracket 86 is suitably attached. The top wall 88 of the plenum chamber 66 forms the central part of the bottom wall of the well 56 to which a bracket 90 is suitably attached. The plenum chamber 66 connects with one or more fresh air ducts 92 through suitable openings in the fire wall 94 which separates the engine compartment from the passenger compartment of the vehicle, the ducts 92 connecting with the air intake grille 22. The front wall of the well 56 at each side thereof is upwardly inclined and has one or more apertures 96 therethrough through which heated air from the engine compartment of the vehicle can flow so as to melt any ice or snow which may accumulate in the well 56, it being understood that the bottom wall of the well 56 is provided with suitable drain openings, not shown, through which water that collects therein may flow.

A first switch 98 having a spring biased, push button actuator 100 is attached to the inner surface of the cover 24 in the central portion thereof, the switch 98 being closed when the cover 24 is in the fully open position, as seen in FIGURE 4, by engagement of the button 100 with the rear wall 80. A second switch 102 is likewise supported on the inner surface of the cover 24 in its central portion, the switch 102 being of the ratchet operated rotary type, and thus has an angularly movable operating lever 104 projecting therefrom. The operating lever 104 is pivotally connected at 106 to one end of a link 108 having its opposite end attached to a Bowden wire 110. The inner end of a coil spring 112 is attached to the link 108, the outer end of the coil spring 112 being attached to a bracket 114 suitably secured to the cover 24. The Bowden wire 110 may be conveniently attached to an instrument panel mounted knob which, when pulled, retracts the Bowden wire 110 to move the cover 24 from the position of FIGURE 3 to the position of FIGURE 4 through the spring 112. Under normal operating conditions the cover 24 can be moved from its fully closed to its fully open position without extending the spring 112, and thus the switch operating lever 104 is not actuated by being moved relative to the cover 24. However, after the switch actuating button 100 is fully depressed by engagement with the rear wall 80, continued thrust on the Bowder wire 110 will result in extension of the spring 112 by movement of the link 108 relative to the cover 24 so as to pivot the switch operating lever 104 and thus actuate the rotary switch 102.

A solenoid 116 is attached to the bracket 90, the solenoid including a coil 118 and a spring retracted latching plunger 120. When the coil 118 is energized, the latching plunger 120 extends through an opening 122 in the rear wall of the well 56 and into engagement with the keeper, or channel portion, 78 of the cover so as to latch it in the fully open position. Energization of the coil winding 118 is controlled by a switch 124 attached to the bracket 86 and having a spring biased, push button operator 126, the switch 124 being held in the open position by engagement of one of the wiper arms 30 with the push button 126 when the wiper blade and arm assemblies are in their depressed parked positions, as seen in FIGURE 3, and the switch 124 is closed to energize the coil 118 when the wiper blade and arm assemblies are moved out of their parked positions.

When the wiper motor is energized thereby effecting movement of the wiper blade and arm assemblies from their depressed parked positions within the well 56 to their operating positions on the windshield 10, the wiper blade and arm assemblies first move throughout parking strokes out of the well 56 and onto the windshield 10. During this movement the wiper blades 32 slide over the concave external surface of the cover 24, and over the lower reveal molding 12 onto the windshield 10. During running operation of the crank assembly 64, the wiper blade and arm assemblies are moved throughout their running strokes between inboard stroke end limits A and outboard stroke end limits B, and thus the blades are maintained in continuous engagement with the outer surface of the windshield.

When wiper operation is discontinued by again pulling the Bowden wire 110, the rotary switch 102 is moved to its "off" position by the lever 104, thereby conditioning the wiper motor for parking operation whereupon the wiper blade and arm assemblies are moved beyond their inboard stroke end limits A, over the lower reveal molding 12 and the cover 24 to their depressed parked positions whereat they are supported by the wall portion 82. At this time the upper wiper blade firmly engages the lower wiper blade, and the lower wiper arm depresses the switch operating button 126 to open the switch 124 and de-energize the coil 118 to release the latch 120. Thereafter, the Bowden wire 110 can be pushed to return the cover 24 to its closed position as seen in FIGURE 3.

Figure 6:
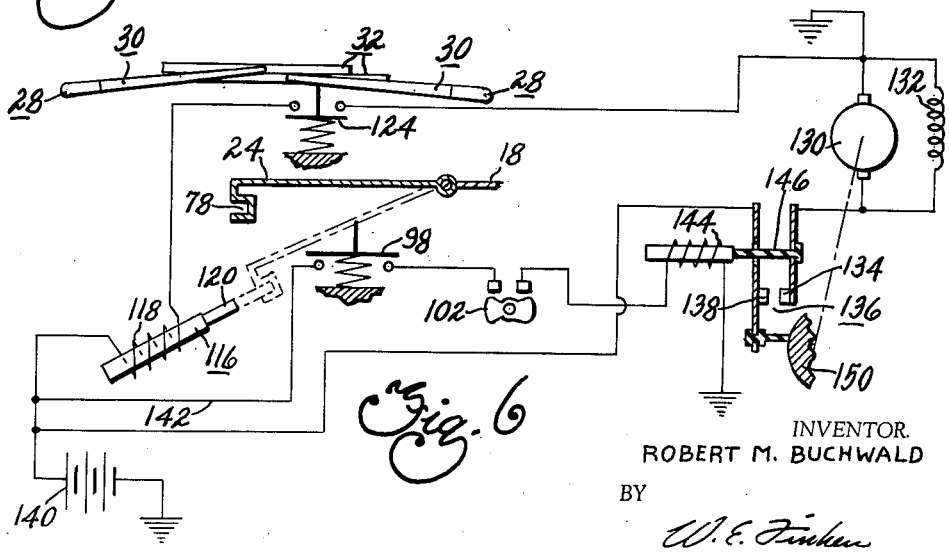
FIGURE 6 is an electrical schematic of the interlocked control system.

Referring to FIGURE 6, the interlocked control system for the wiper mechanism comprises the cover operated switch 98, the wiper arm operated switch 124 and the rotary manual wiper control switch 102. The electric wiper motor is shown having an armature 130 and a shunt field winding 132, one terminal of the armature being connected to ground and the other terminal of the armature being connected to a leaf spring contact 134 of a parking switch 136. The parking switch 136 includes a second leaf spring contact 138, the leaf spring contacts 134 and 138 being inherently biased towards each other. The leaf spring contact 138 is connected to one terminal of a battery 140, the other terminal of which is grounded. The battery 140 is also connected by a wire 142 to the push button cover operated switch 98 which is connected in series with the rotary switch 102. The series connected switches 98 and 102 are connected to a relay coil 144 having a plunger 146 for moving the contact 134 into engagement with the contact 138 to energize the wiper motor.

The latch operating coil 118 is connected to the battery and to the switch 124. The variable throw crank assembly driven by the motor includes a cam member 150 for separating contacts 134 and 138 by deflecting the leaf spring contact 138 when the relay 144 is de-energized. As is apparent from the circuit shown in FIGURE 6, it is necessary that switches 98 and 102 be closed to complete an energizing circuit for the relay 144, and hence effect closure of contacts 134 and 138 to energize the wiper motor. Thus, the interlocked switches 98 and 102 preclude operation of the wiper mechanism when the cover 24 is closed since the switch 98 is only closed when the cover 24 is fully open. Likewise, should the cover freeze closed, thus requiring excessive pull to be exerted on the Bowden wire 110 so as to close switch 102 with the cover in the fully closed or in a partially open position, the energizing circuit for the wiper motor will not be completed since switch 98 will remain open. Moreover, the cover 24 will only be latched in its fully open position when the wiper mechanism is operating since the switch 124 is only closed when the wiper blade and arm assemblies are not in their depressed parked positions. Moreover, the cover 24 will not be released unless movement of the wiper blades is arrested in their depressed parked positions whereat switch 124 will be open so as to de-energize the coil 118 and release the latch pin 120. When the wiper blades arrive at their depressed parked positions which is under manual control by opening of switch 102, the parking switch 136 will be opened by the cam 150 deflecting the contact 138.

From the foregoing it is apparent that the present invention provides an improved cover operating mechanism for concealing the wiper blade and arm assemblies when not in use. By hinging the cover along its rearward edge and moving it downwardly into the well to a position where it will not interfere with the blade and arm assemblies in their stowed positions, it is relatively easy to break any accumulated ice or snow at the forward edge thereof. Moreover, the present invention enables heated engine air to be used for melting any accumulated ice or snow within the well, and the cover neither obstructs vision through the windshield, interferes with normal air flow over the windshield, nor mars the appearance of the vehicle when it is open. Moreover, the interlocked control system positively precludes malfunctioning of the system since the cover cannot be closed when the wiper mechanism is operating, and the wiper mechanism cannot be energized when the cover is closed.

While the embodiment of the invention as herein disclosed constitutes a preferred form, it is to be understood that other forms might be adopted.

What is claimed is as follows:

1. In a vehicle, a rearwardly inclined windshield, a forwardly extending cowl adjacent the lower edge of the windshield, a transversely extending well beneath said cowl having an access opening therethrough, a pair of spaced pivot shafts supported on said vehicle and extending into said well, a wiper arm attached to each pivot shaft and carrying a wiper blade at its outer end, motor means mounted in said vehicle and drivingly connected to said pivot shafts for imparting conjoint oscillation to said wiper arms and blades, a cover for said access opening hingedly connected to said cowl adjacent its rearward edge, the major portion of said cover being disposed within said well, when open, and constituting a ramp for supporting said wiper blades during movement from their stowed positions within said well to their operating positions in contact with said windshield, and means operable to open and close said cover.

2. In a vehicle, a rearwardly inclined windshield, a cowl adjacent the lower edge of the windshield and extending forwardly therefrom, a well beneath said cowl having an access opening in said cowl, a cover for said access opening hingedly connected to said cowl at its rearward edge and movable between open and closed positions, a pair of spaced pivot shafts mounted in said vehicle and extending into said well, a pair of wiper blade and arm assemblies attached to said pivot shafts, motor means drivingly connected to said pivot shafts for oscillating said wiper blade and arm assemblies from a depressed parked position whereat said wiper blade and arm assemblies are stowed in said well to a working position wherein said wiper blades engage the outer surface of said windshield for oscillation between predetermined inboard and outboard stroke end limits, said cover constituting a ramp for said wiper blade and arm assemblies during movement from their parked position to their working position, and means precluding operation of said motor means when said cover is closed.

3. In a vehicle, a rearwardly inclined windshield, a cowl adjacent the lower edge of the windshield and extending forwardly therefrom, a well beneath said cowl having an access opening in said cowl, a cover for said access opening hingedly connected to said cowl at its rearward edge and movable between open and closed positions, a pair of spaced pivot shafts mounted in said vehicle and extending into said well, a pair of wiper blade and arm assemblies attached to said pivot shafts, motor means drivingly connected to said pivot shafts for oscillating said wiper blade and arm assemblies from a depressed parked position whereat said wiper blade and arm assemblies are stowed in said well to a working position wherein said wiper blades engage the outer surface of said windshield for oscillation between predetermined inboard and outboard stroke end limits, and means precluding closure of said cover when said motor means is operating.

4. In a vehicle, a rearwardly inclined windshield, a cowl adjacent the lower edge of the windshield and extending forwardly therefrom, a well beneath said cowl having an access opening in said cowl, a cover for said access opening hingedly connected to said cowl at its rearward edge and movable between open and closed positions, a pair of spaced pivot shafts mounted in said vehicle and extending into said well, a pair of wiper blade and arm assemblies attached to said pivot shafts, motor means drivingly connected to said pivot shafts for oscillating said wiper blade and arm assemblies from a depressed parked position whereat said wiper blade and arm assemblies are stowed in said well to a working position wherein said wiper blades engage the outer surface of said windshield for oscillation between predetermined inboard and outboard stroke end limits, means operable to latch said cover in its open position whereat the outer surface of said cover constitutes a ramp for guiding movement of said wiper blades from their stowed positions to their operating positions, means for conditioning said motor means for operation only when said cover is fully open and means controlling said latch means so as to preclude closure of said cover when said motor means is operating.

5. A control system for concealed windshield cleaning mechanism having a wiper motor, oscillatable cleaner means driven by said motor and movable throughout a running stroke having predetermined inboard and outboard stroke end limits and to a depressed parked position beyond the inboard stroke end limit, said cleaner means being disposed in a well, when parked, and a pivotally mounted cover for closing an access opening to said well to conceal the cleaner means when not in use, including, manually operable means for moving said cover between open and closed positions, latch means engageable with said cover for maintaining it in the open position, and latch control means precluding release of said latch means during operation of said wiper motor.

6. A control system for concealed windshield cleaning mechanism having a wiper motor, oscillatable cleaner means driven by said motor and movable throughout a running stroke having predetermined inboard and outboard stroke end limits and to a depressed parked position beyond the inboard stroke end limit, said cleaner means being disposed in a well, when parked, and a pivotally mounted cover for closing an access opening to said well to conceal the cleaner means when not in use, including, means for actuating said cover to move it between open and closed positions, a pair of serially connected control elements for said wiper motor having first and second positions, said wiper motor being operative only when said serially connected control elements are in their second positions, actuating means for one of said control elements for automatically moving said one control element from its first position to its second position when said cover is fully open, and actuating means for the other control element operatively connected with said cover actuating means whereby the wiper motor will not be operative unless said cover is in the fully open position.

7. A control system for concealed windshield cleaning mechanism having a wiper motor, oscillatable cleaner means driven by said motor and movable throughout a running stroke having predetermined inboard and outboard stroke end limits and to a depressed parked position beyond the inboard stroke end limit, said cleaner means being disposed in a well, when parked, and a pivotally mounted cover for closing an access opening to said well to conceal the cleaner means when not in use, including, means for moving said cover between open and closed positions, latch means for retaining said cover in its fully open position, latch control means operated by said cleaner means for precluding release of said latch means during operation of said wiper motor, a pair of serially connected control elements for said wiper motor having first and second positions, said wiper motor being operative only when said control elements are in their second positions, and means enabling movement of said pair of control elements to their second positions only when said cover is moved to its fully open position.

8. A control system for concealed windshield cleaning mechanism having a wiper motor, oscillatable cleaner means driven by said motor and movable throughout a running stroke having predetermined inboard and outboard stroke end limits and to a depressed parked position beyond the inboard stroke end limit, said cleaner means being disposed in a well, when parked, and a pivotally mounted cover for closing an access opening to said well to conceal the cleaner means when not in use, including, means for moving said cover between open and closed positions, latch means for retaining said cover in its fully open position, latch control means operated by said cleaner means for precluding release of said latch means during operation of said wiper motor, a pair of serially connected control elements for said wiper motor having first and second positions, said wiper motor being operative only when said control elements are in their second positions, means operable to automatically move one of said control elements to its second position by movement of said cover to its fully open position, and means for moving the other control element between its first and second positions independently of said one control element.

9. Windshield cleaning mechanism for a vehicle having a windshield with a cowl extending forwardly thereof, a well disposed beneath said cowl and having an access opening through said cowl and a pivotally mounted cover for closing said access opening, including, an electric wiper motor, an oscillatable cleaner connected to said wiper motor and having a running stroke with predetermined inboard and outboard stroke end limits and a parking stroke whereby said cleaner is moved beyond said inboard stroke end limit to a depressed parked position within said well, manually controlled means for opening and closing said cover, and an energizing circuit for said wiper motor including a pair of serially connected switches, one of said switches being closed automatically upon movement of said cover to its fully open position and the other of said switches being independently actuated by the cover operating means whereby the energizing circuit for said electric wiper motor can only be completed when the cover is in its fully open position.

10. Windshield cleaning means for a vehicle having a windshield with a cowl extending forwardly thereof, a well disposed beneath said cowl and having an access opening through said cowl and a pivotally mounted cover for closing said access opening, an electric wiper motor, an oscillatable cleaner connected to said wiper motor and having a running stroke with predetermined inboard and outboard stroke end limits and a parking stroke whereby said cleaner is moved beyond said inboard stroke end limit to a depressed parked position within said well, cover operating means comprising a Bowden wire and a coil spring operatively connecting said Bowden wire to said cover, an energizing circuit for said electric wiper motor comprising a pair of serially connected switches, one of said switches being closed when the cover is fully open and open at all other times, and operating means for the other of said switches comprising a pivotally movable lever having one end pivotally attached to a link, said link being connected to said Bowden wire, the operative connection between said spring and said Bowden wire including said link whereby said spring means must be extended by reciprocable movement of said link to operate said second switch.

11. Windshield cleaning means for a vehicle having a windshield with a cowl extending forwardly thereof, a well disposed beneath said cowl and having an access opening through said cowl and a pivotally mounted cover for closing said access opening, a wiper motor, an oscillatable cleaner connected to said wiper motor and having a running stroke with predetermined inboard and outboard stroke end limits and a parking stroke whereby said cleaner is moved beyond said inboard stroke end limit to a depressed parked position within said well, cover operating means for moving said cover between open and closed positions, a solenoid operated latch for retaining said cover in its fully open position, switch means for energizing said solenoid, and an actuator for said switch means operated by said cleaner whereby said switch means is closed at all times except when said cleaner is in its depressed parked position, and open when said cleaner is in its depressed parked position.

References Cited in the file of this patent

UNITED STATES PATENTS 2,895,157    Kocourek _____ July 21, 1959

FOREIGN PATENTS 826,115    Great Britain _____ Dec. 23, 1959